United States Patent [19]

Karp

[11] 3,851,859

[45] Dec. 3, 1974

[54] APPARATUS FOR MIXING CLAY

[76] Inventor: John I. Karp, 1176 20 Rd., Fruita, Colo. 81521

[22] Filed: June 4, 1973

[21] Appl. No.: 365,999

[52] U.S. Cl. .................................... 259/6, 222/342
[51] Int. Cl. ........................... B01f 7/02, B01f 7/04
[58] Field of Search ........... 259/6, 9, 10, 21, 41, 45, 259/46, 104, 185, 186; 222/342; 221/174; 53/258

[56] References Cited
UNITED STATES PATENTS

| | | | |
|---|---|---|---|
| 2,363,961 | 11/1944 | Hart | 222/342 |
| 2,946,574 | 7/1960 | Munderich | 259/6 |
| 3,363,396 | 1/1968 | Lockrow | 53/258 |
| 3,463,459 | 8/1969 | Loomans | 259/6 |
| 3,702,691 | 11/1972 | Fritsch | 259/6 |

Primary Examiner—Harvey C. Hornsby
Assistant Examiner—Robert Pous
Attorney, Agent, or Firm—Van Valkenburgh, Lowe & Law

[57] ABSTRACT

A clay mixing apparatus wherein a mixing chamber receives a charge of clay and water. Rotating paddles within this chamber blend the clay and water to a desirable plastic mix. An inclined, rotating paddle pushes the clay about the wall of the chamber and past a normally closed gate connecting with a bagging chute. When clay is to be discharged, the gate moves into the chamber and into the path of the inclined paddle which pushes the gate to a closed position each time the paddle moves past it. Whenever the gate resists this pushing movement, the clay upon the paddle is forced past the gate and into the chute, and such action effectively pumps the plastic clay through the chute to permit a bag fitted over this chute to be filled with the clay ejected therefrom.

10 Claims, 14 Drawing Figures

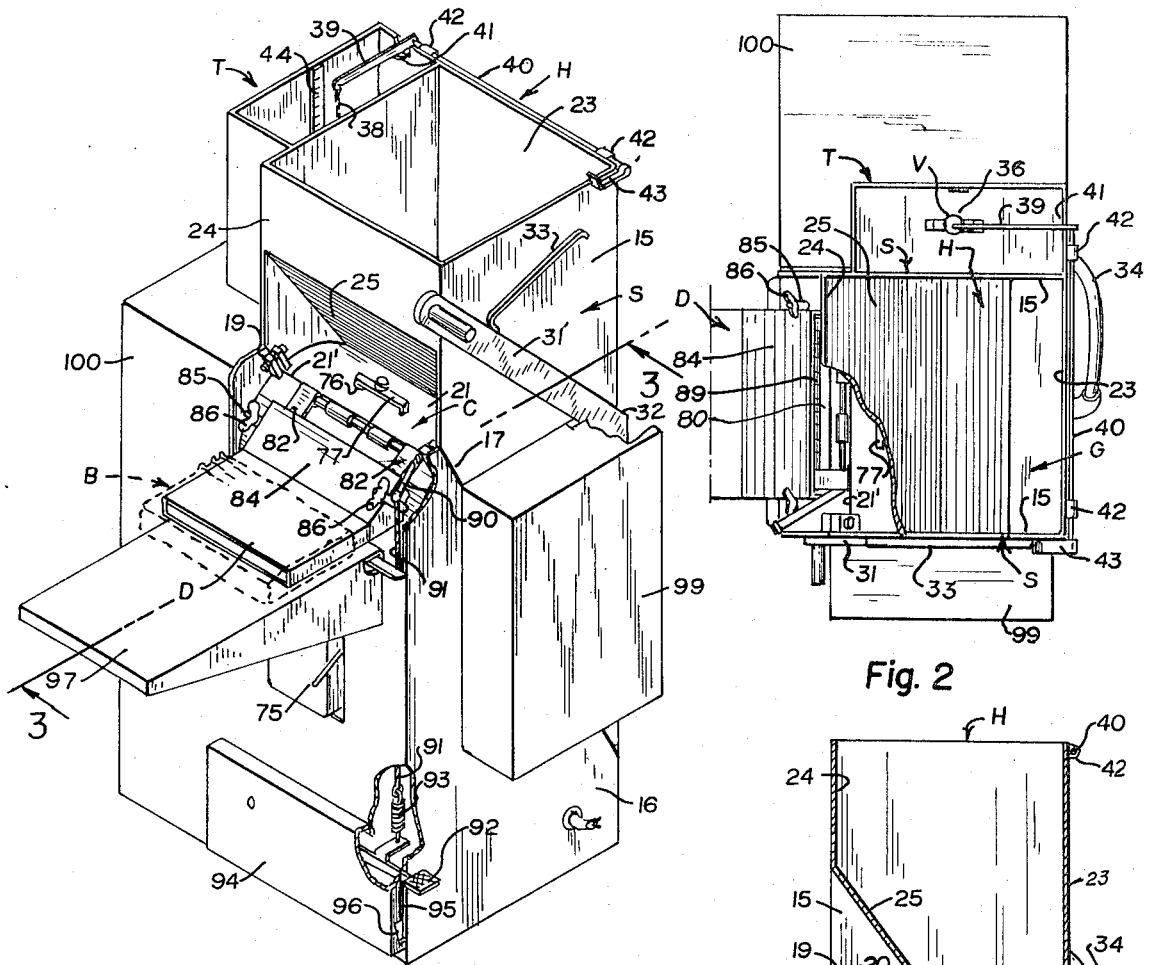
Fig. 1
Fig. 2
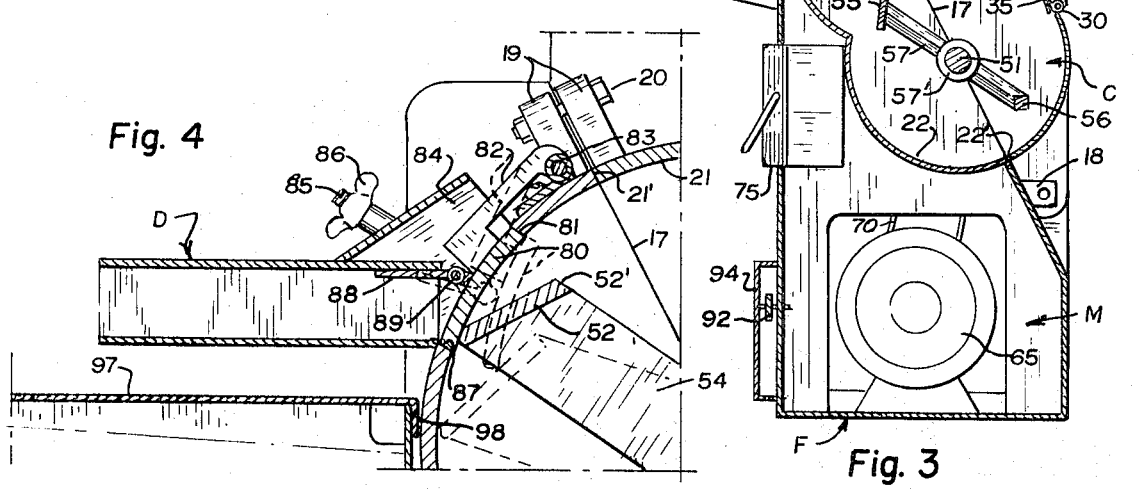
Fig. 4
Fig. 3

APPARATUS FOR MIXING CLAY

This invention relates to mixing and blending apparatus, and more particularly to apparatus for mixing viscous materials, such as, but not restricted to, a clay and water blend, to selected consistencies.

A primary object of the invention is to provide a novel and improved apparatus for mixing clay and water; hence, the invention will be hereinafter called a "Clay Mixer," although it is to be understood that the invention can be used for other purposes.

The invention, when used as a clay mixer, prepares moist, plasticized clay for the manufacture of pottery and for similar purposes, where an artisan forms a bowl or the like upon a potter's wheel, normally referred to as "throwing," or kneads and shapes the clay to a selected form. Many types of clay and an infinite number of clay bodies may be used for this purpose, determined by the type and configuration desired in the item being produced, but all of these clay bodies are similar in that they are prepared in essentially the same manner. The clay normally comes to the potter pulverized bagged. Many types are available with each type having reasonably dependable physical qualities. From these many types of clay, the potter then formulates the desired clay body for the work he wishes to do. The clay is then blended with water to form a thick, plastic material which will yield under pressure, but which will retain its form once it is shaped into an article of manufacture.

A skilled artisan will demand a clay-water blend having a selected plasticity to suit his needs and will not like to use clay-water blends having either too mcuh or too little water content. This may be difficult to attain and to maintain with any degree of consistency from one batch of mixed clay to the next. Thus, proper clay mixing is an important part of pottery manufacture and the like, and in mixing clay in conventional mixers, such as in tubs or pug mills, a considerable amount of time may be expended in endeavoring to adjust the clay-water mixture to a desired consistency. It is also advantageous to store the clay in this plasticized, moist state for a period of time ranging from 2 weeks up, in order to further plasticize the clay through aging. If the clay is to be stored, it is necessary to keep the moist, mixed material in an air-tight bag or in other containers such as cans with tight lids. However, the bagging of a batch of the clay can be a messy, awkward, time consuming process, especially because properly mixed clay can be very sticky. Clay is commonly stored in comparatively large cans, from 25 to 50 gallon capacity. However, these containers will become very heavy when partially filled, and also will take up an unreasonable amount of floor space in a studio.

The present invention was conceived and developed with the foregoing and other considerations in view and comprises, in essence, a simplified clay mixer having an upright, two-barrel mixing chamber with the barrel sections partially merging into each other. Unblended, dry clay and water will drop into the lower section to be blended and moved throughout both sections of the chamber by intertwining paddles. When the clay and water within the mixing chamber are suitably blended, it may then be pumped by the paddle action through a bagging chute and into a bag, all as hereinafter set forth.

It follows that another object of the invention is to provide a novel and improved clay mixer which can accommodate in proper proportions a measured batch of clay and a measured amount of water at the commencement of each batch mixing operation, thereby arriving at an accurate moisture content by a very simple procedure.

Another object of the invention is to provide in a clay mixer, an intertwining array of mixing paddles which cooperate with each other to constantly clean and wipe clay adhering to the walls of the mixing chamber and also upon the mixing paddles, whereby to more quickly and effectively produce a uniform blend of clay and keep the power required to effect the mixing to a minimum.

Another object of the invention is to provide, in a novel and improved clay mixer, a simple gate means through which small amounts of clay may be projected during the mixing operation to quickly determine the stiffness and consistency of the clay as it is being mixed, and thus permit small amounts of the clay or water to be added before the completed blend of clay and water is discharged from the apparatus and into a bag.

Another object of the invention is to provide a clay mixing apparatus which will automatically pump the clay into a bagging chute to fill a bag with a clay-water blend whenever the operator determines that the blend has been mixed to a proper consistency within the mixing chamber.

Other objects of the invention are to provide a novel and improved clay mixer which is a simple, rugged, economical, durable and reliable structure.

with the foregoing and other objects in view, my present invention comprises certain constructions, combinations and arrangements of parts and elements as hereinafter described, defined in the appended claims and illustrated in preferred embodiment by the accompanying drawings in which:

FIG. 1 is an isometric view of the clay mixer, with portions of the framework being broken away to show parts otherwise hidden from view;

FIG. 2 is a plan view of the clay mixer with portions broken away to show parts otherwise hidden from view, and other portions broken away to conserve space;

FIG. 3 is a transverse sectional elevational view as taken from the indicated line 3—3 at FIG. 1;

FIG. 4 is a portion of the view shown at FIG. 3, but on an enlarged scale and with broken lines indicating alternate positions of elements and components shown therein;

Figure 5:
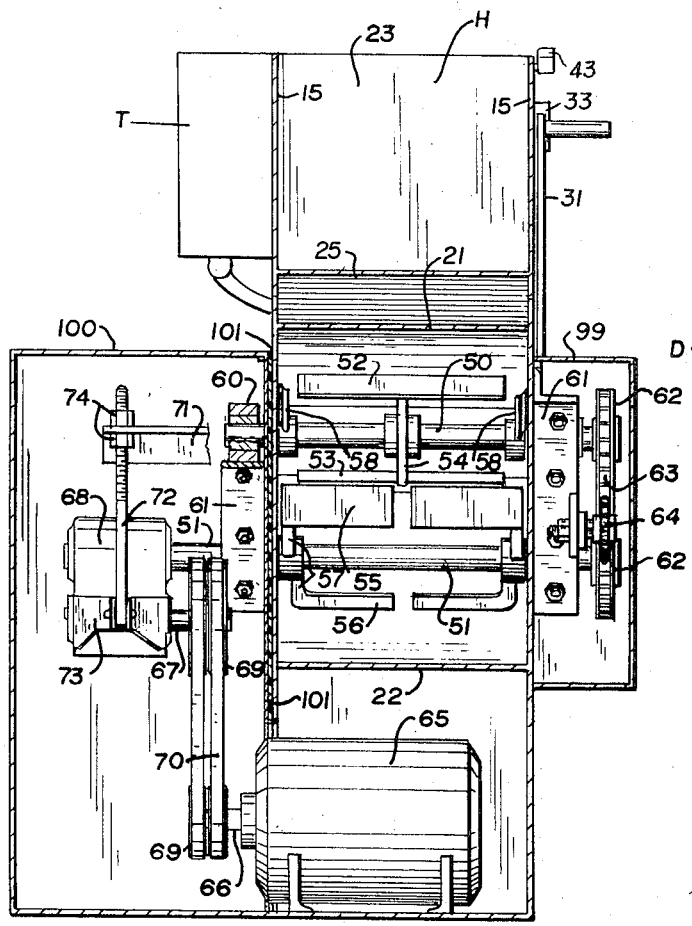
FIG. 5 is a front elevational view of the apparatus, with various wall portions being removed and in section to show the mixing and driving components within the apparatus.

Referring more particularly to the drawing, the clay mixing apparatus combines an array of components into an upright box-like structure. The structure is formed of suitable sections of material such as sheet metal and other structural shapes which are folded, welded and bolted together by conventional fabricating procedures. Clay is received in a hopper H at the top of the apparatus. Water is received in a tank T alongside the hopper. A gate G at the base of the hopper and a valve V in the floor of the tank open to drop the clay and water into a mixing chamber C through an opening at the back of the chamber. Intertwining paddles in this chamber mix the clay and water until the ingredients are blended to a plastic consistency. When suitably blended, the resulting plastic clay is discharged through a bagging chute D at the top of the mixing chamber and into a bag B sleeve-fitted over the discharge end of the chute, as shown in broken lines at FIG. 1. The bags used for this purpose are conventional, easily obtained and preferably they are made of impervious material which will snugly fit upon the chute D and will be extended from the chute as they are filled. When these bags are filled and closed, they will keep the clay moist and fresh until it is ready for use.

The hopper H, the valve V, the mixing chamber C and a motor compartment M are disposed between upright sidewalls S to define the center section of the apparatus. The tank T is secured to one of these sidewalls alongside the hopper. Driving and transmission components are mounted on the sidewalls at both sides of this center section and these components are housed in box-like covers attached to the sidewalls, as hereinafter described. The bottom of this structure is a floor F which may set upon any suitable base and if mobility is desired, the base may have wheels.

Each sidewall S is formed as two sections, an upper section 15 and a lower section 16 which abut together at a separation line 17. The separation lines 17 are steeply inclined with their top ends being at the forward edges of the sidewalls and their bottom ends being at the rear edges of the sidewalls as shown. The separation lines are also at the longer diametric center of the mixing chamber C to divide that chamber into two halves as will be described. The upper sidewall section 15 forms part of the hopper above the mixing chamber, as will be described, while the lower sidewall section 16 forming the motor compartment below the mixing chamber is closed with a front wall plate 16a, the floor F and a backwall plate 16b, as hereinafter further described. A hinge ear 18 outstands from each lower section 16 near the bottom of the separation line 17 and the pintle of this hinge ear 18 will connect with the lower rear corner of the corresponding upper section 15 to permit the sections to swing apart in the manner illustrated at FIG. 11. This separation permits easy cleaning of the mixing chamber. When the apparatus is in use, these sections 15 and 16 of each sidewall 5 will be joined together at the top of their separation line 17 by connecting lugs 19, which are welded to these sections at opposite sides of the line 17. Each pair of lugs 19 have registered holes to receive connective bolts 20 as best shown at FIG. 3.

Figure 8:
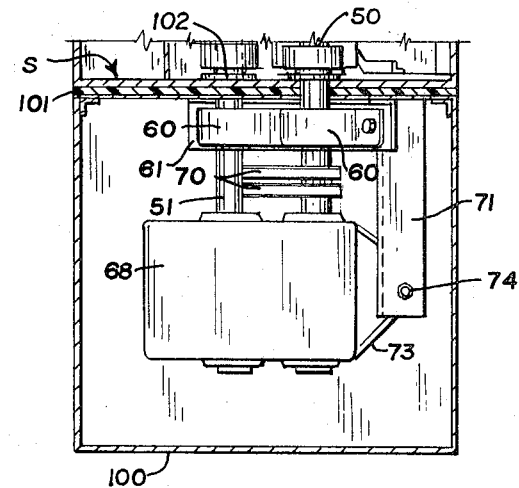
FIG. 8 is a fragmentary sectional plan view, as taken from the indicated line 8—8 at FIG. 7 but on an enlarged scale.

The mixing chamber C is located below the hopper, at the sidewall separation lines 17, and this location is preferably at a height which will permit an operator to easily work with the discharge chute D which extends outwardly from the upper portion of the chamber. The transverse walls of the mixing chamber C, between the opposing sidewalls S, consist of an upper cylindrical shell 21 and a lower cylindrical shell 22 which are merged together in a manner suggestive of a figure 8 when viewed in section. The upper portion of this chamber leans forwardly from an upright position, with the axis of each shell 21 and 22 intersecting the separation lines 17 of the sidewalls. Thus, to separate this chamber into two halves, as mentioned, the upper cylindrical shell 21 is divided into two parts at a separation line 21' which connects with the opposing sidewall separation lines 17 and the lower cylindrical shell 22 is divided into two parts at a separation line 22' which also connects with the sidewall separation lines 17.

The mixing chamber includes a transverse opening to receive clay and water which may drop from the hopper H and the tank T. This opening is located at the rear sloping side of the mixing chamber at the juncture between the two cylindrical shells 21 and 22 and this opening is normally blocked by the gate G as best illustrated at FIG. 3.

The hopper H, at the top of the apparatus, between the sidewalls, includes a back wall 23 which extends downwardly between the rear margins of the upper sidewall sections 15 and its bottom edge abuts against the top of the gate G. The hopper also includes a front wall 24 which extends downwardly from the top edge of this hopper between the front margins of the upper sidewall sections 15 for a short distance. Thence, a floor 25 slopes downwardly and rearwardly from this front wall to contact the back side of the upper chamber shell 21 adjacent to the gate G, as best illustrated at FIG. 3.

Figure 6:
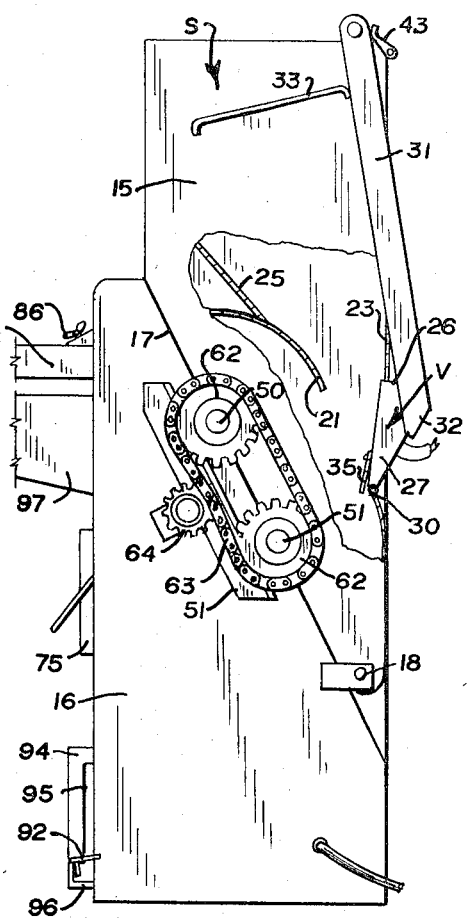
FIG. 6 is a right side elevational view of the apparatus with the discharge chute and table broken away to conserve space, with a cover panel removed to illustrate a chain drive between the mixer shafts, with an infeed lever shifted to its open position and with portions of the side wall behind the lever broken away to show the manner in which the infeed gate opens when the lever is shifted.
Figure 12:
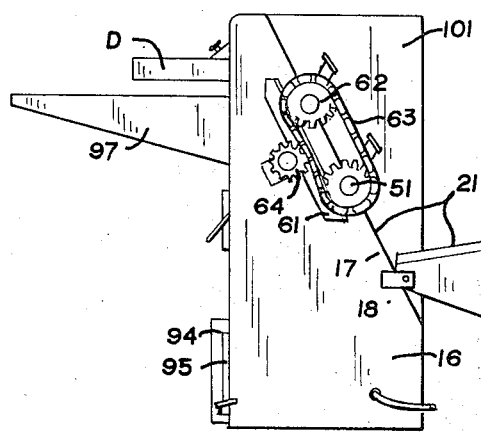
FIG. 12 is a small-scale right side elevational view of the apparatus, but with the upper section being swung rearwardly from the base section to exemplify the manner in which the unit may be opened for cleaning.

The gate G is of a type commonly designated as a drum gate. As such, it is a simple prismatic member, pie-shaped in section, having closed ends 26, an arcuate face 27, an outer rear side 28 and inner side 29 which converge from the opposite edges of the face 27 to a hinge 30 at the axis of the arcuate surface. This gate is mounted transversely at the rear side of the chamber wall with the hinge 30 being located at the rear margin of the sidewalls and at the bottom of the chamber opening. It is thus directly below the back wall 23 of the hopper when the gate is standing upright so that one corner of the arcuate face 27 will be at the bottom edge of the back wall 23 when the gate is closed. The reach of the arcuate face 27 is such that the opposite corner of this face 27 will be at the upper edge of the opening of the chamber C when the gate is closed. When the gate G is opened, it will swing rearwardly and outwardly with the face 27 being underneath the bottom edge of the rear wall of the hopper, as best illustrated at FIG. 6. Then the clay within the hopper will fall directly into the mixing chamber.

This rearward swing of the gate is provided by a handle 31 which is secured to the outer side 28 of the gate. This handle is folded about a sidewall of the apparatus, as at 32, in such a manner as to extend to a forward position alongside a sidewall 15 where it may be easily reached by an operator and pushed rearwardly to open the gate. The handle is held in position by abutting against the end of a simple stop bar 33 secured to the sidewall of the unit. To push the handle rearwardly to open the gate, this handle is merely flexed sidewise to clear the stop bar 33.

Whenever clay is to be dropped into the mixing chamber, it is desirable to introduce a charge of water and the gate is arranged to accomplish this. As mentioned, the water tank T is mounted on a sidewall S alongside the hopper with the valve V being at the floor of this tank. A flexible line 34 extends from the valve V, at the underside of the tank, to the back side 28 of the gate G so that water may flow into this gate when the valve V is opened. The opposite inner side 29 of the gate is provided with a slot-like opening adjacent to the hinge which is normally closed by a simple flap 35. However, water will easily flow from the valve past this flap and into the chamber C. This flap is desirable to prevent clay which is being mixed in the chamber from being pushed into the gate cavity.

Figure 7:
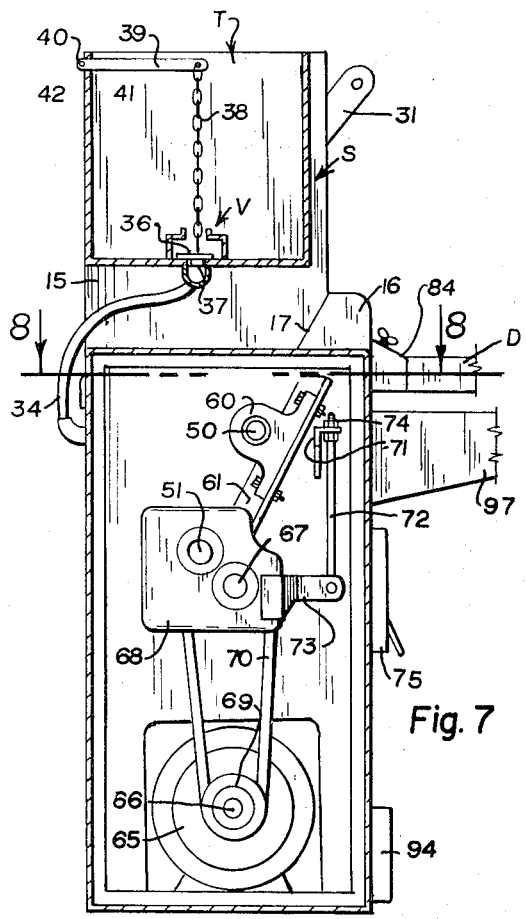
FIG. 7 is a left side elevational view of the apparatus with the discharge components broken away to conserve space and with wall portions removed and in section to show the drive system and the interior of the water infeed tank.

Various types of quick acting valves may be used with the line 34. A suitable type is shown as a valve V at the floor of the tank. This valve V consists of a stopper 36 overlying an orifice 37 in the tank floor. The stopper is lifted from the orifice by a chain 38, or the like, to open the valve. The chain may be held by an outstanding cantilevered lever 39 which in turn is connected to one end of a rod 40 which rotates to lift the lever 39. A stop 41 on the backwall of the tank holds the lever 39 at the outstanding position shown at FIG. 7. The rod extends transversely across the rear top edge of the gate and hopper to the opposite sidewall S, and this rod is held in bearing block 42 to permit it to rotate. A detent 43 extends from the end of the rod at the opposite sidewall at a position where it is adapted to be contacted and lifted to rotate the rod by the handle 31 when the handle is shifted rearwardly to open the gate. Thus, when the gate G is opened, the valve V is also opened. However, it is to be noted that an operator may lift the detent manually to open the valve if he desires to release water into the mixing chamber without releasing clay. It is also to be noted that a selected volume of water may be poured into the tank for any selected amount of clay to produce a batch of plastic clay having a precise water content and, if necessary, a gauge 44 may be provided in this tank for measuring the water content.

The mixing chamber carries two sets of rotating paddles with the upper set mounted upon a shaft 50 extending transversely across the chamber at the axis of the upper shell 21 and a lower set mounted upon a shaft 51 extending transversely across the chamber at the axis of the lower shell 22. Thus, the shafts lie apart in spaced parallelism at the separation line 17 of the sidewalls. The paddles on the upper shaft include an outer, flat scraping paddle 52 which sweeps against the shell 21 as it rotates and a diametrically opposing bar paddle 53 which sweeps through a circular path within the chamber. These paddles are carried upon a bar arm 54 at the center of the chamber, which is connected to the shaft by a collar 54'.

Figure 9:
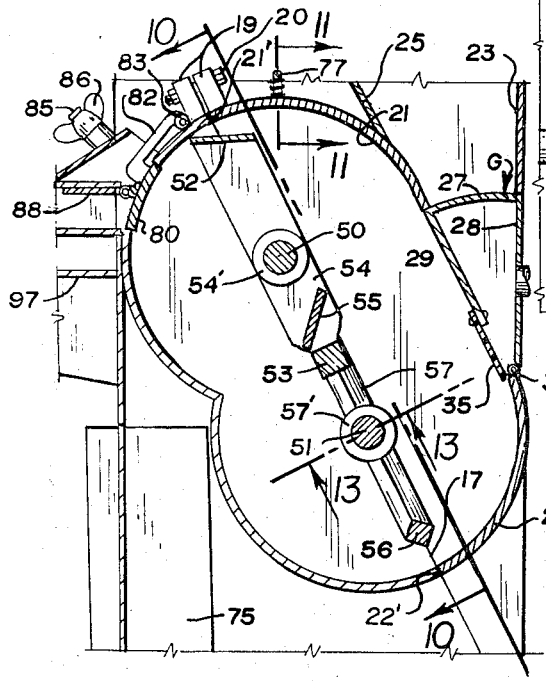
FIG. 9 is a transverse sectional view similar to a portion of FIG. 3, but on an enlarged scale with the mixing components being shown at an alternate position, and with arrows indicating the direction of movement of these components.
Figure 10:
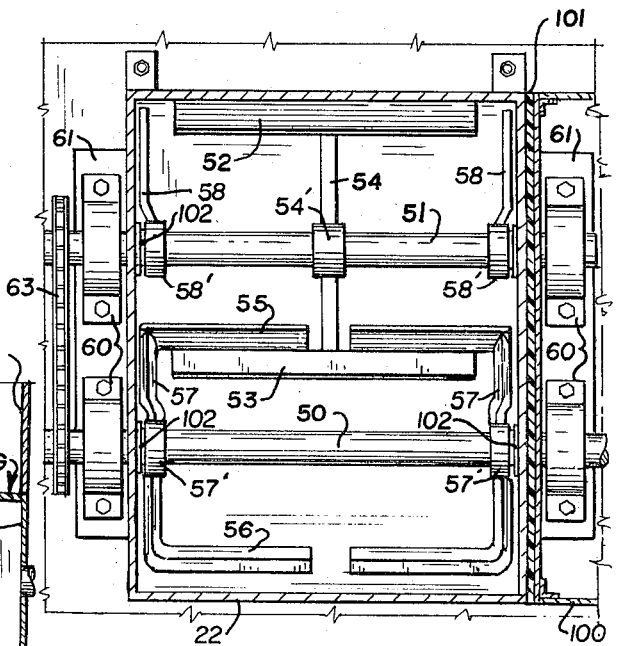
FIG. 10 is a fragmentary sectional view as taken from the indicated line 10—10 at FIG. 9.

The upper and lower paddles intertwine because of the proximity of the shafts 50 and 51 and the two sets of paddles must be arranged to clear each other and to clear the arms upon which they are carried. Therefore, the lower paddles are mounted upon the lower shaft as opposing pairs cantilevered extend from support arms at the opposite sides of the chamber with their extended ends being near the center of the chamber but spaced apart at this center to clear the arm 54, as illustrated at FIG. 10. Thus, the paddles on the lower shaft include a pair of outer scraping paddles 55 which sweep against the shell 22 as they rotate and a pair of diametrically opposing bar paddles 56 which sweep through a circular path within the chamber. Each scraping paddle 55 and its opposing bar paddle 56 is carried upon an arm 57 at its side of the chamber, the arm being connected to the shaft by a collar 57'. One portion of this side arm 57 is extended laterally to lie closely against the sidewall S to scrape accumulated clay from the sidewall. The upper paddles 52 and 53 are necessarily narrower than the chamber to clear these arms 57 supporting the intertwining lower paddles and thus a supplementary scraper arm 58 is mounted upon the upper shaft 50 at each side of the chamber as in a collar 58' to scrape accumulated clay from the sidewalls of the chamber, as best illustrated at FIG. 10. The paddles on both shafts 50 and 51 rotate together in unison by a drive mechanism hereinafter described, and they are timed so that the scraping paddle 52, or 55, of one shaft will sweep past the bar paddle 56, or 53, of the other shaft with a close clearance, as best illustrated at FIG. 9, so that the bar paddle on one shaft will scrape excess clay from the scraping paddle of the other shaft. In the drawing, it is to be noted that the rotation of these shafts are in a clockwise direction, as shown at FIGS. 3 and 4, so that the scraping paddle 52 will move upwardly at the front side of the shell adjacent to the discharge chute D. Regardless of the direction of movement, the scraping paddle 52 is inclined with respect to its movement so that its leading edge 52' is away from the sidewall shell, so that a leading V-shaped pocket is formed between the shell and the scraping paddle, to carry a slug of mixed clay which will be forced through a gate valve and into the discharge chute, as will be described.

The two shafts 50 and 51 extend through the sidewalls S to be mounted in bearings 60 carried upon angle ledges 61 adjacent to the outer face of the lower section sidewalls 16. Since these two shafts rotate in the same direction in unison, they are projected from the bearings at one side of the apparatus to carry sprockets 52 which are interconnected by a chain 63. An idler sprocket 64 is also adjustably carried upon the angle ledge 61 in line with the sprockets 62 to function as a chain tightener.

In the embodiment illustrated and described, the lower shaft 51 extends from its bearings at the opposite side of the apparatus to connect with the drive mechanism. This drive mechanism, as best shown at FIG. 5, includes an electrical motor 65 which is mounted upon the floor F of the apparatus in the motor compartment M. Its drive shaft 66 extends from an opening in the sidewall to operatively connect with the input shaft 67 of a speed reducer 68 through pulleys 69 on these shafts which are interconnected by belt 70. The speed reducer 68 is mounted upon the extension of the lower shaft 51 with this lower shaft constituting the output shaft of the speed reducer.

Accordingly, this output shaft is fixed and a rocking movement of the speed reducer about this shaft can be used to tighten the belt 70. To accomplish this, a support arm 71 outstands from the sidewall S in front of the speed reducer. A threaded rod 72 connects with the outstanding end of the support arm 71 and extends to a clevice 73 on the speed reducer. Accordingly, adjustment of the rod in the support arm will lift the speed reducer to tighten the belts. This is accomplished by adjustment nuts 74 at the arm. When the motor 65 is an electric motor, it can be operated by a switching arrangement which may be positioned at any suitable location on the apparatus. The drawings indicate this motor control as a starter box 75 mounted upon the front of the chamber below the discharge chute assembly as indicated at FIG. 1. The electrical circuits to the box and from the box to the motor are not shown since they are conventional. It is to be noted that these circuits may include conventional overload switches and also safety switches which, for example, can prevent the apparatus from being operated whenever the two sidewall sections are separated.

Figure 11:
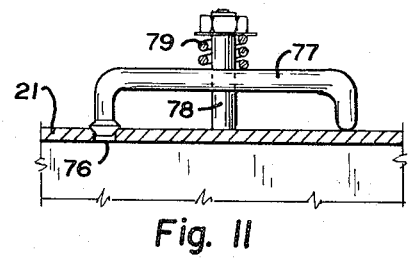
FIG. 11 is a fragmentary sectional detail as taken from the indicated line 11—11 at FIG. 9 but on an enlarged scale.

Once the apparatus is started and clay and water are dropped into the mixing chamber, the mixing will proceed until the clay-water blend has attained a suitable plasticity. A convenient mode for testing this plasticity is provided at the top of the mixing chamber in the form of a small diameter opening 76 where clay which is pushed around the mixing chamber by the scraping paddle 52 will also be pushed upwardly through this opening. The opening 76 will be normally closed by a simple plug handle 77 which is in the general form of a U-bar held in place upon the surface of the chamber shell 21 by an upstanding rod 78 which extends through the handle with a spring 79 resiliently urging the handle into the opening, as best shown at FIG. 11. Thus, when the operator desires to test the mix, he merely moves this handle away from the opening 76 to permit small amounts of clay to be pushed through the opening.

Once the blend has attained its desirable plasticity, an unloading cycle may commence where it is discharged from the chamber and into the discharge chute D. This discharge of the clay is effected by a positive pumping action by a gate 80 in a transverse slot-like opening 81 at the front portion of the upper mixing chamber shell 21. The gate 80 is held in place by a pair of hinged arms 82 affixed to the outer face of the gate and to pivots 83 at the outer surface of the shell 21 above the opening 80. These arms 82 will permit the gate to swing into the chamber to contact the inclined paddle 52 as it rotates about its shaft 50. Before the unloading cycle commences and during the mixing and blending of the clay and water, this paddle and the clay upon it will push the gate to its closed position and pumping will not occur. However, when the gate is urged into the chamber with a positive forceful bias, a lower edge strikes the paddle and is pushed outwardly from the chamber and into the opening 81 with a definite force. All of the clay which is carried in the V-shaped pocket between the shell and the paddle 52, as heretofore mentioned, will then be urged through the gate before the gate closes with the mechanisms functioning in the manner shown in broken lines at FIG. 4.

The discharge chute D is a flat, rectangular, tubular member of selected dimensions having substantially the same width as the gate. This discharge chute is held in place by a structural cowl 84 which in turn is secured in position upon the outer face of the upper shell 21 by bolts 85 outstanding from the surface of the shell. Wing nuts 86 are provided to place this discharge chute D in position without the use of special tools. The lower entrance corner 87 of the discharge chute is at the lower edge of the opening 81. The sides of the discharge chute are confined by the cowl structure 84 to better confine the movement of clay from the opening and into the chute. The top portion, however, can be the source of a clay leak and accordingly a flap 88 is secured to the outer surface of the gate, as at a hinge 89, to provide an adjustable closure at this top surface, as best shown at FIG. 4.

The positive bias to pull the gate 80 inwardly to effect pumping of the clay is produced by an arm 90 outstanding from one of the pivot arms 82 holding the gate and connecting with a cable 91 which extends downwardly behind a front wall covering plate to a foot pedal 92 and connects with this foot pedal by a spring 93. The foot pedal is carried within a suitable box 94 and is adapted to move downwardly through a slot 95 having an offset to permit the foot pedal to be locked in place. Thus, whenever an operator wishes to pump clay, he merely pushes the foot pedal downwardly to urge the gate into the chamber and locks the foot pedal in the tensioned position by pushing it into the offset 96.

The apparatus may include auxiliary features, such as a table 97 which is extended beneath the bagging chute and is held in position by a suitable lip 98 engaging the front wall of the lower section of the unit. The sprocket-chain drive 62 is enclosed in a box 99 secured to the outer face of the sidewalls while the drive controls are secured in a box 100 at the opposite side. Preferably, this box 100, carrying the drive motor and the speed reducer, is completely enclosed with a rubber gasket 101 being positioned between the box and the sidewalls as in the manner shown at FIG. 8. This gasket 101 will thus afford protection for the motor and speed reducer against clay and other substances.

Figure 13:
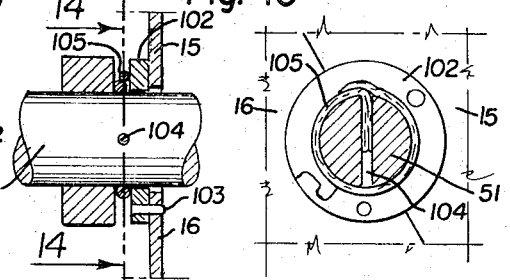
FIG. 13 is a fragmentary sectional detail as taken from the indicated line 13—13 at FIG. 9 but on an enlarged scale.
Figure 14:
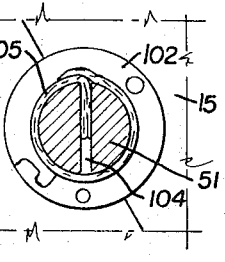
FIG. 14 is a fragmentary sectional detail as taken from the indicated line 14—14 at FIG. 13.

FIGS. 13 and 14 illustrate an effective mode for sealing the shafts 50 and 51 at the walls 15 and 16 where these shafts extend through the wall sections. As shown at FIGS. 13 and 14, a split machine bushing 102 embraces the shaft 51 and is modified to provide a connector pin 103 to attach the bushing to the wall of the lower section 16. A small gap will be provided between this bushing 102 and the collar 57'. A small hole 104 in the shaft 51 at this gap will receive and hold the end of a thong 105 which will wrap upon the shaft whenever the shaft rotates. This thong will effectively prevent a clay leak and will minimize wear of the shaft and sidewall.

I claim:

1. Apparatus for mixing dry and fluid materials such as clay and water to a blend of plastic consistency comprising:

a. a mixing chamber having a cylindrical wall, a rotative paddle means to mix and interblend ingredients within the chamber with one paddle moving close to the cylindrical wall as the paddle means rotates; a receiver opening in the chamber to receive such material and a discharge opening in the cylindrical wall of the chamber adjacent to the path of the said one paddle from whence the blended material may be discharged;

b. a means for charging the mixing chamber through the receiver opening with a selected amount of dry material and fluid to permit the mixing chamber to blend the same;

c. a gate at the discharge opening normally closing this opening to retain material within the chamber when the same is being mixed by the paddle means;

d. a swinging means associated with the gate to swing the gate into the mixing chamber to momentarily traverse the path of the said paddle within the chamber to divert clay carried by the paddle into the discharge opening as the paddle moves to the opening but to shift out of the path of said paddle as the paddle moves past said opening, said swinging means normally permitting the paddle and clay upon it to push the gate to its closed position to prevent such diversion; and e. a manually-actuated biasing means associated with the swinging means to forcibly swing the gate into the mixing chamber to hold the gate open to discharge clay carried by the paddle as the paddle moves toward the opening.

2. In the organization defined in claim 1, wherein:
said paddle is formed as a member having a leading edge and trailing edge, with respect to the direction of movement, paralleling the axis of the cylindrical wall, with the leading edge inclined into the chamber away from the cylindrical wall and the trailing edge lying closely adjacent to the cylindrical wall, whereby to form a moving "V" with respect to the surface of the cylindrical wall to facilitate picking up and moving a wad of mixed material ahead of the paddle; and thus
whenever said gate is moved into the mixing chamber by the biasing means, the gate will first engage a wad of mixed material carried by the paddle to deflect the same into the discharge opening and thereafter engage the inclined surface of the paddle to be resiliently pushed into the discharge opening by slipping on the inclined paddle surface and to a closed position out of the way of said paddle.

3. In the organization defined in claim 1, including:

a bagging chute extending from said discharge opening and being proportioned to permit a bag to be sleeve-fitted upon its exit end to thereby be filled with blended material as the material is pushed through the chute.

4. In the organization defined in claim 1, wherein:
said mixing chamber includes two intermeshed, cylindrical shells which, when viewed in section, are in the general form of a figure eight and wherein:

said paddle means comprises a shaft at the axis of each shell, and paddles carried upon each shaft with at least one paddle on each shaft lying closely adjacent to the respective cylindrical wall concentric with that shaft.

5. In the organization defined in claim 1, wherein:
the mixing chamber consists of two segments which fit together, and
a hinge means at the base of the segments to facilitate separating them and opening the chamber as for inspection or cleaning.

6. The organization defined in claim 2, wherein:
the biasing means is a spring loaded pedal.

7. Apparatus for mixing dry and fluid materials such as clay and water, to a blend of plastic consistency, comprising:

a. a mixing chamber having rotative paddle means to mix and interblend ingredients deposited therein, a receiver opening in the chamber to receive such materials and a discharge opening in the wall of the chamber adjacent to a path of a paddle of the paddle means from whence the blended material may be discharged;

b. a hopper for dry materials communicating with the mixing chamber through said receiver opening;

c. a hopper gate at the receiver opening which normally closes the same and a means to open the gate to permit a batch of dry material deposited in the hopper to enter the chamber;

d. a tank for fluid material communicating with the chamber through a fluid passageway exiting into the chamber; and e. a normally closed valve means at the passageway and a means to open the valve to permit fluid in the tank to flow into the mixing chamber; and wherein the hopper gate is formed as a drum gate having an arcuate wall at the bottom of the hopper to normally close the hopper, an inner wall at the receiver opening to form a portion of the wall of the mixing chamber and ends closing the gate, with the inner wall extending from the inner edge of the arcuate wall to a hinge at the opposite side of the gate, said gate being adapted to swing rearwardly to move the inner wall away from the receiver opening as the arcuate wall swings away from the bottom of the hopper to permit material in the hopper to flow into the mixing chamber.

8. In the organization defined in claim 7, wherein:
the hopper drum gate is a closed gate having the said inner wall, an outer wall and ends closing the gate with the inner and outer walls converging from the edges of the arcuate wall to the hinge;
a transverse slot at the inner wall of the gate and said fluid passageway consists of a tubular member connecting with the gate to permit fluid to flow into the gate through the slot and into the mixing chamber.

9. In the organization defined in claim 8, including:

a flap means at the slot to permit water to flow from the gate into the hopper but to prevent clay from being pushed into the gate.

10. In the organization defined in claim 8, wherein:

a connecting means connects the hopper gate and the valve means whereby both open substantially simultaneously to discharge both materials, the dry material and the fluid, from the chamber and from the tank at the same time.

* * * * *